H. HOUSE.
TRACTOR.
APPLICATION FILED APR. 14, 1919.

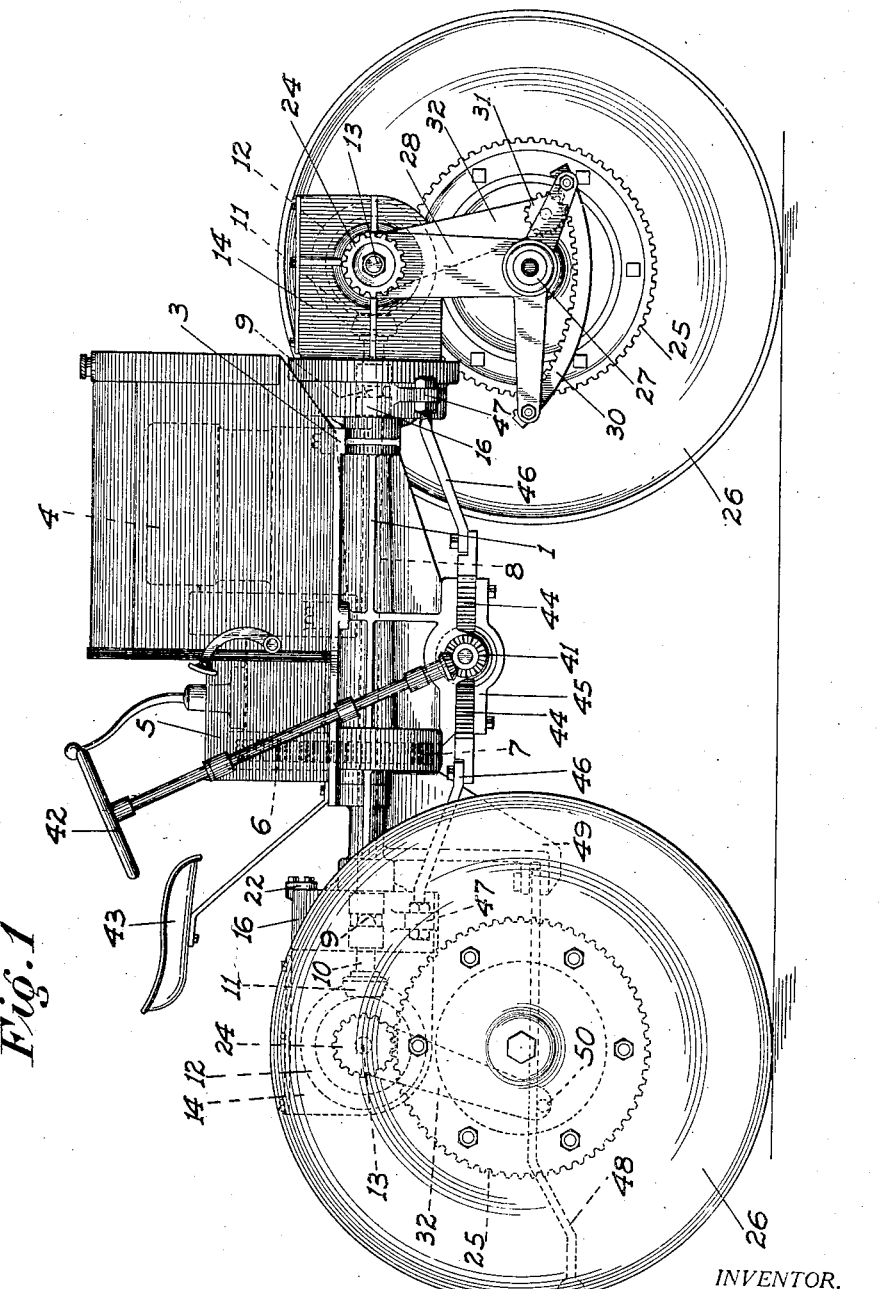

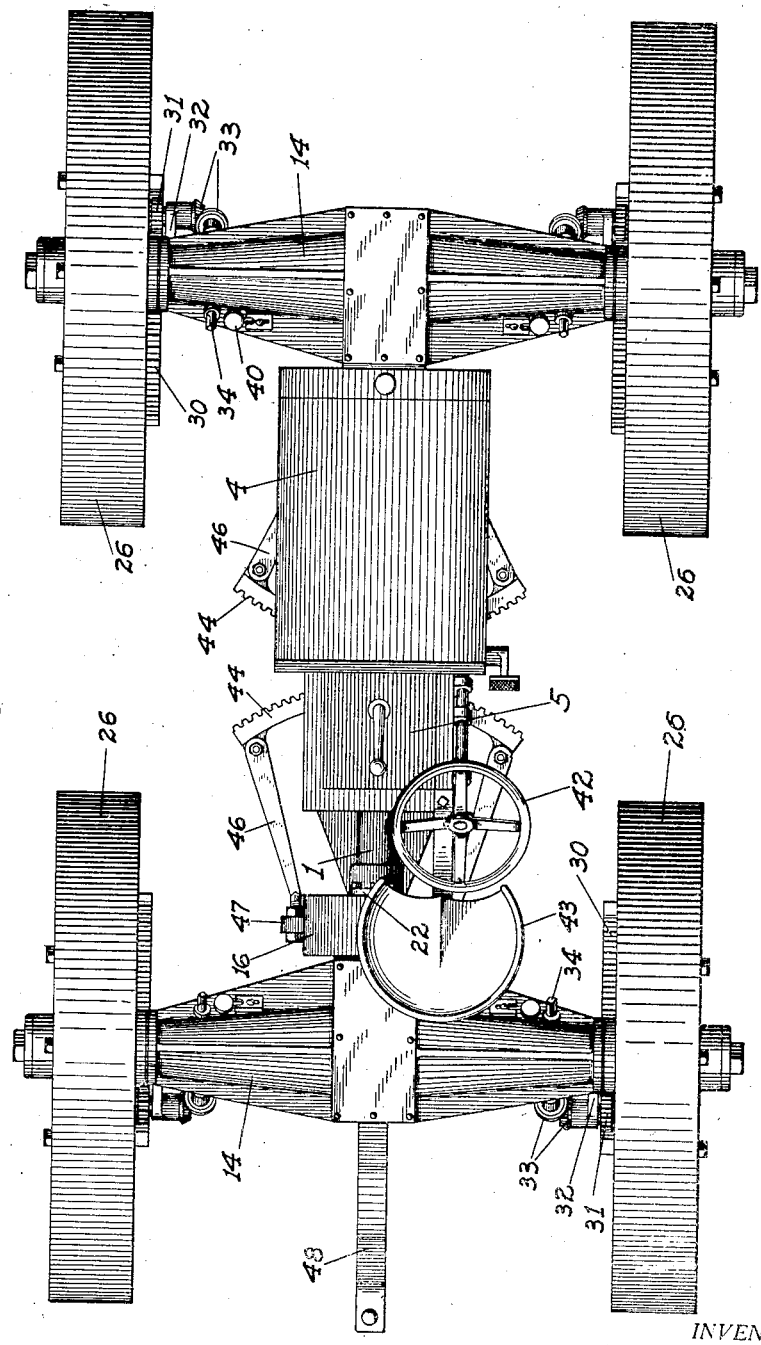

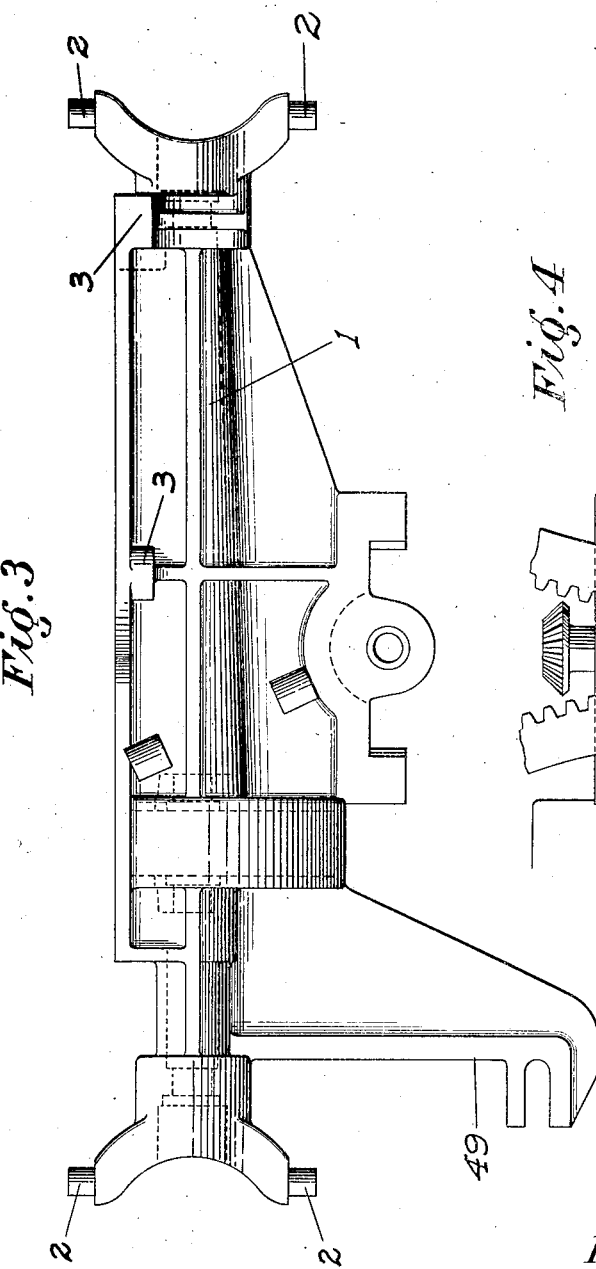
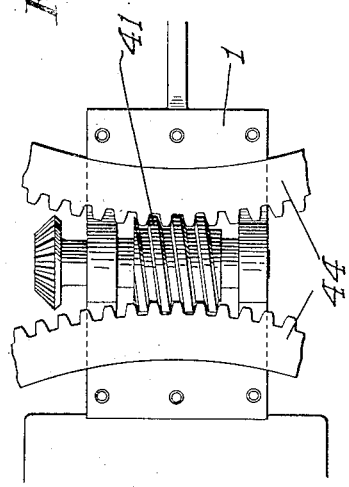

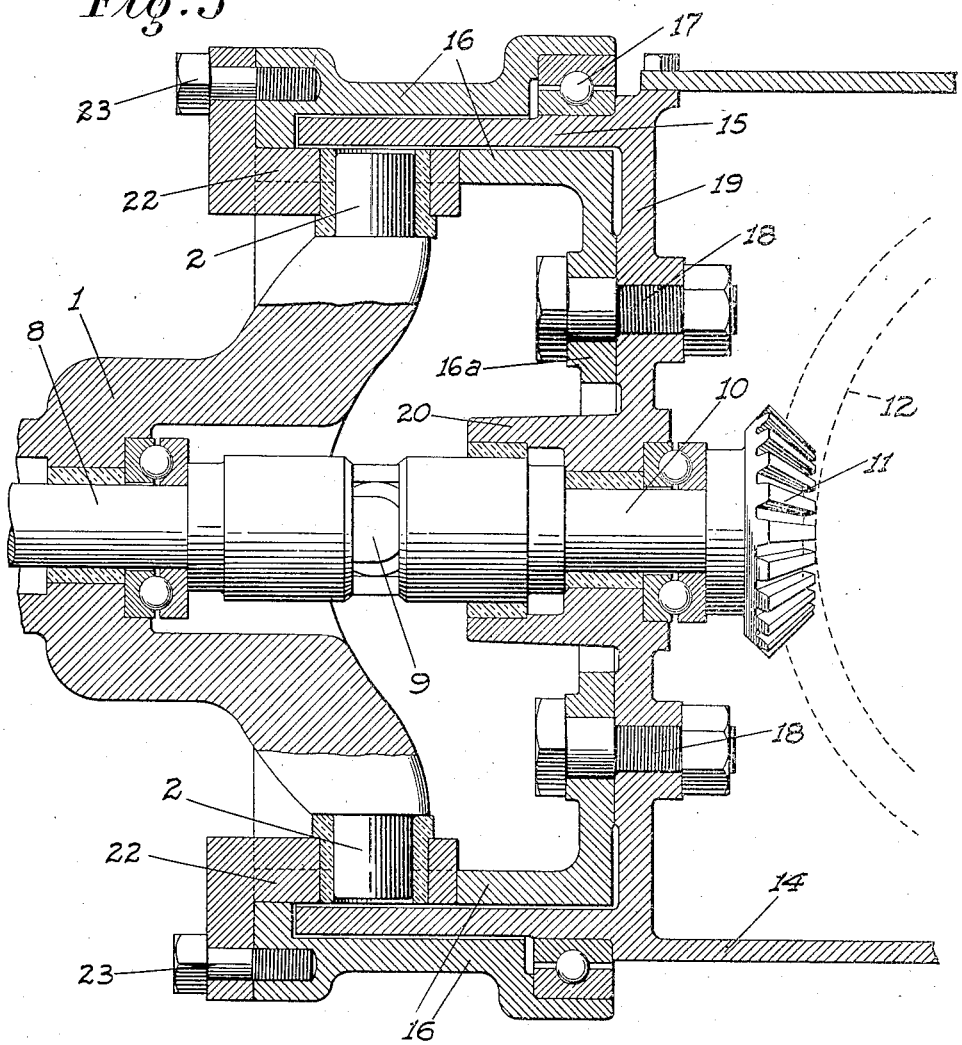

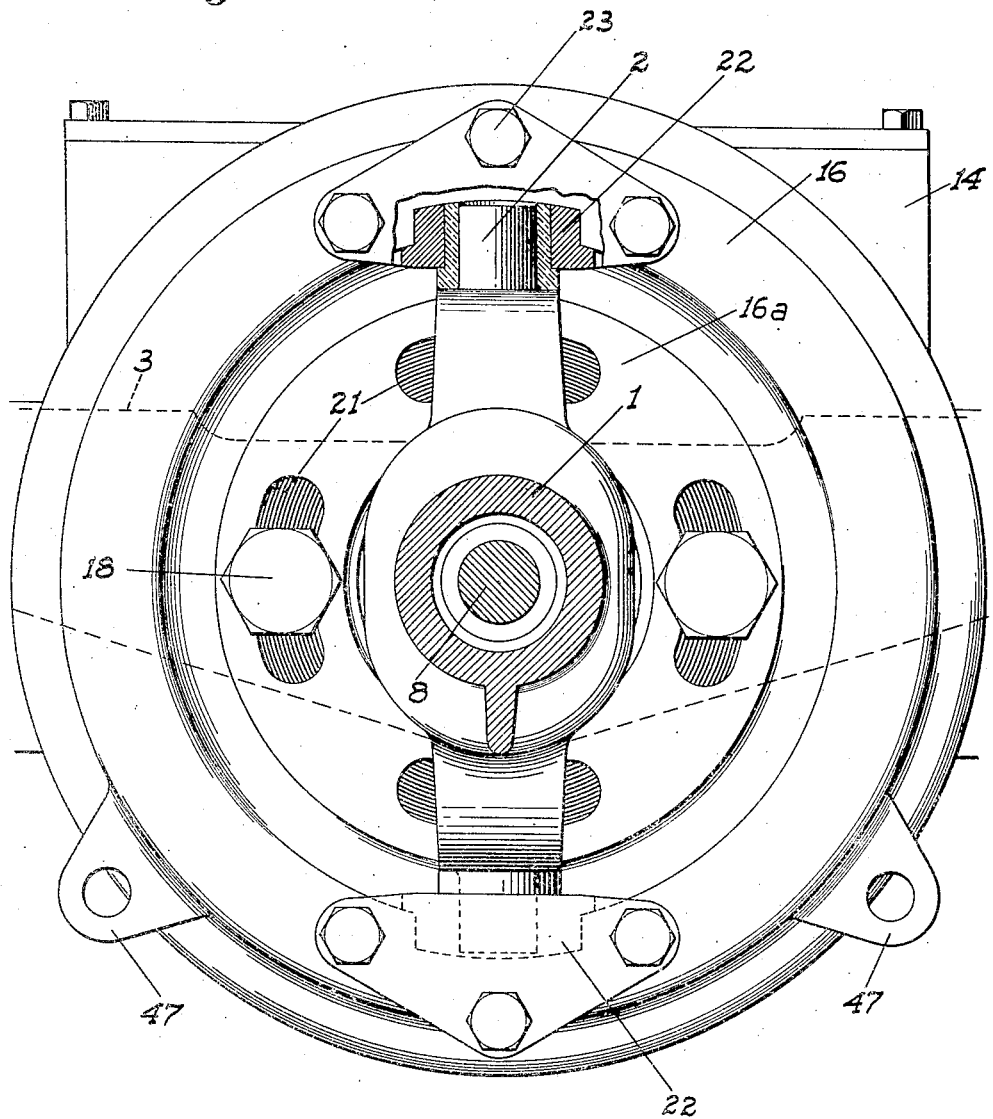

1,349,065.

Patented Aug. 10, 1920.
6 SHEETS—SHEET 6.

INVENTOR.
Horace House
BY
ATTORNEY

UNITED STATES PATENT OFFICE.

HORACE HOUSE, OF RAYL, CALIFORNIA.

TRACTOR.

1,349,065.  Specification of Letters Patent.  Patented Aug. 10, 1920.

Application filed April 14, 1919. Serial No. 289,784.

*To all whom it may concern:*

Be it known that I, HORACE HOUSE, a citizen of the United States, residing at Rayl, in the county of Lassen, State of California, have invented certain new and useful Improvements in Tractors; and I do declare the following to be a full, clear, and exact description of the same, reference being had to the accompanying drawings, and to the characters of reference marked thereon, which form a part of this application.

This invention relates to improvements in tractors, and particularly to those of the four wheel drive type.

The principal object of the invention is to produce a tractor of the aforementioned type in which both pairs of wheels may be steered in unison to turn the tractor in a very short space without interfering with or discontinuing the driving power to all the wheels. This sharp turning of the tractor also permits the implement, or vehicle being pulled by the tractor to make a correspondingly sharp turn.

Another object is to so arrange the driving mechanism of the tractor that great clearance from the ground is obtained without raising the total height of the tractor to an undue degree. This prevents any dirt from being ground into the mechanism, a disadvantage so common on low-hung tractors.

A still further object is to arrange and secure the wheels to the tractor in such a manner that each one may be independently raised or lowered while still maintaining the driving relation of the same with the motive power of the tractor.

This feature is of great advantage when the tractor is being used for side-hill work, as it enables the tractor to be maintained in a true horizontal position transversely of the same. The same feature may be utilized when the tractor is climbing a steep grade, to maintain the true longitudinal horizontal position of the same.

Also, this feature, in both cases besides rendering the tractor more comfortable for the operator riding thereon, also prevents possible engine troubles, especially with internal combustion engines, for a continued angular setting of the motor may interfere with the proper flow of the fuel thereto and prevent the proper functioning of the lubricating system of the engine. As a fourth object I have done away with the necessity of a tractor frame, as the term is commonly understood, and have mounted the operative parts, both the driving and steering mechanism directly onto the main shaft and gear housing.

This feature provides great rigidity, and eliminates any tendency toward ill fitting of the parts and undue and destructive vibration due to the possible weakness and bending of a frame.

It also makes for greater simplicity and lightness of construction by permitting a lesser number of parts to be used.

Another object is to produce a simple and relatively inexpensive tractor and yet one which will be exceedingly effective for the purposes for which it is designed.

These objects I accomplish by means of such structure and relative arrangement of parts as will fully appear by a perusal of the following specification and claims.

On the drawings, similar characters of reference indicate corresponding parts in the several views.

Figure 1 is a side elevation of my improved tractor.

Fig. 2 is a top plan view of the same.

Fig. 3 is a side elevation of the main gear housing and frame, detached from the remainder of the tractor.

Fig. 4 is a bottom plan view of a steering worm arrangement.

Fig. 5 is a cross section of a front end universal-joint housing and collar.

Fig. 6 is an end view looking into the same.

Figure 7:
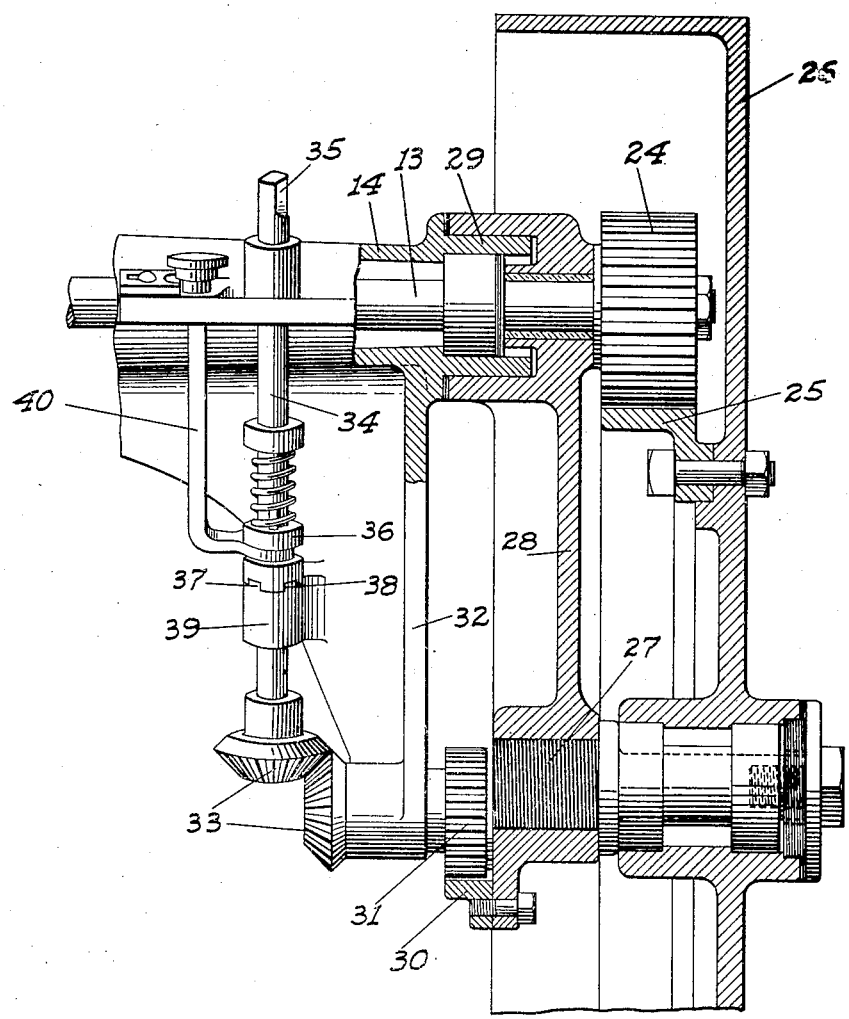
Fig. 7 is a vertical section through one of the wheels showing the mechanism for the vertical adjustment of the same.

Referring now more particularly to the characters of reference on the drawings, the numeral 1 denotes the main longitudinal frame and gear housing, preferably a one-piece casting on each end of which are a pair of vertical and spaced pins 2, suitably machined, for a purpose as will appear. This member has lugs 3 suitably positioned on each side thereof adapted to support a power plant 4 thereon, the latter being preferably of the internal combustion type commonly used. To the rear of the power plant and operatively connected therewith is a transmission box 5 of the usual type, to the main shaft of which is secured a pinion 6 adapted to constantly engage a gear 7 keyed to the drive shaft 8 of the tractor, the same being positioned in the housing 1 and extending lengthwise thereof. To each end of the shaft 8 is secured one end of a universal joint 9, the turning axes of which are always in alinement with the centers of the pins 2. The outer end of the universal joints 9 are secured to stub shafts 10 on the further ends of which are bevel gears 11 adapted to mesh with driving bevel gears 12 secured to shafts 13 positioned transversely of the shaft 8 and mounted for turning in transverse housings 14.

Each of such housings 14 is provided with an open ended cylindrical portion 15 extending in alinement with the shafts 10 and projecting over the universal joints 9 and the pins 2. A double collar 16 fits over such extended portion 15, the forward one of such collars being mounted for rotation relative to the member 15 by means of suitable bearings 17 between the two.

The collars 16 are held against longitudinal movement relative to the housings 14 by means of a plurality of bolts 18 through suitable flanges on the inner ends of the collars and through webs 19 on the said housing, which webs have bearing bosses 20 central thereof to retain the shafts 10 therein.

The flanges 16ª on the forward one of such collars 16 is provided with radial slots 21, the bolts 18 passing therethrough in order to permit a certain amount of turning motion of the collar 16 relative to the bolts and housing 14, for a purpose as will appear. These slots are omitted in the rear collar however, plain holes being used for the bolts, as no movement of the collar at that end is necessary or desired.

The pins 2 are turnably and removably mounted in the collars 16 by means of removable pin-bearing members 22, adapted to slide into suitable recesses cut in the collars diametrically thereof, these members being firmly secured to the vertical faces of the collars by bolts 23.

Each of the transverse shafts 13 is provided with a differential of any of the ordinary forms, the same being preferably positioned in the housings 14 adjacent the driving gears 12 therein.

On the outer ends of the shafts 13 are secured pinions 24 adapted to mesh with gears 25 rigidly mounted in the driving wheels 26 of the tractor. The spindles 27 of these wheels are secured in rocker arms 28 depending from the shafts 13 behind the pinions thereon, the rocker arms being turnably mounted relative to the housings 14 on the machined shoulders 29 projecting therefrom, such shoulders being concentric with the shafts 13.

Segmental annular gears 30 radial from the shafts 13 are mounted on the lower ends of the rocker arms and are adapted to mesh with pinions 31 mounted in downwardly depending arms 32 integral with the housings 14 on the outer ends thereof. Motion to each of the pinions 31 is had by means of miter gears 33, one being secured to the pinion 31 and the other to a substantially vertical shaft 34 mounted for rotary movement to the housing 14. The top of the shaft 34 projects above the housing 14, and may be squared off as shown at 35, to provide for a turning means being placed thereon. Undesired turning of the shaft 34 is prevented by means of a spring pressed grooved collar 36 slidably mounted thereon and provided with lugs 37 adapted to engage in recesses 38 provided in one of the bearing bosses 39 of the shaft 34. The collar may be raised when desired to permit the shaft 34 to turn by means of an arm 40 slidably mounted to the housing 14, or by any other suitable means.

Each pair of wheels 26 and its housing 14 and the features thereon forms a unit, turnably about the pins 2 and universal joints 9 as an axis. To effect the steering of both these units simultaneously, I provide a worm 41 mounted to the housing 1 beneath the same and transversely thereof, the longitudinal position of this worm being exactly half way between the turning axis 2 of the wheel units. This worm is operatively connected with a steering wheel 42 suitably positioned adjacent the driver's seat 43 on the member 1. Toothed quadrants 44 radial from the axes 2 are adapted to mesh with the worm 41 and are held adjacent the housing 1 by means of guide bars 45 secured to the housing, the quadrants being slidable therein.

Arms 46 extend from each end of each quadrant to the collars 16, to which they are secured by being bolted to lugs 47 projecting from the outer periphery thereof. A draw-bar 48 may extend between the rear pair of the wheels 26 and be secured to the housing 1 as by means of an extension 49 depending from the housing. It may be further supported by means of a rod 50 positioned transversely of the rear arms 32 and secured thereto, on which the bar 48 rides.

By means of the above described construction it will be seen that I have provided a universal driving means to all four wheels of the tractor by using only two universal joints instead of the four on the knuckles of the wheel-spindles as at present commonly employed with four-wheel drives.

By means of the rotatable collar on the forward wheel unit, the same may have transverse swiveling motion to offset any unevenness in the transverse contour of the ground without interfering in any way with the driving or steering mechanism of this unit.

Also, by means of the quadrants 30 and the hand operated pinions 31, independent for each wheel, I am enabled to raise any wheel from its normal position when desired to maintain the true horizontal position of the tractor when working on side hills, etc., without impairing or interfering with the driving connection of the wheels.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:—

1. A tractor comprising a main longitudinal housing having a power plant thereon, transverse housings positioned at the ends of the main housing transversely and centrally thereof, vertical pins on the ends of the main housing turnably mounted in the transverse housings, shafts in the same operatively connected to wheels mounted thereon, a longitudinal drive shaft in the main housing in driving relation with the power plant and with the transverse shafts to turn the wheels, and universal joints on the drive shaft in vertical alinement with the vertical pins on the main housing.

2. A tractor comprising a main longitudinal housing having a power plant thereon, transverse housings positioned at the ends of the main housing transversely and centrally thereof, vertical pins on the ends of the main housing turnably mounted in the transverse housings, shafts in the same operatively connected to wheels mounted thereon, a longitudinal drive shaft in the main housing in driving relation with the power plant and with the transverse shafts to turn the wheels, universal joints on the drive shaft in vertical alinement with the vertical pins on the main housing, and means whereby the forward one of the transverse housings may have turning movement relative to the main housing, with the drive shaft as an axis.

3. A tractor comprising a main longitudinal housing having a power plant thereon, transverse housings positioned at the ends of the main housing transversely and centrally thereof, vertical pins on the ends of the main housing turnably mounted in the transverse housings, shafts in the same operatively connected to wheels mounted thereon, a longitudinal drive shaft in the main housing in driving relation with the power plant and with the transverse shafts to turn the wheels, universal joints on the drive shaft in vertical alinement with the vertical pins on the main housing, and means whereby the forward one of the transverse housings may have turning movement relative to the main housing, with the drive shaft as an axis, such means including a collar turnably mounted on a cylindrical extension on the transverse housing concentric with the drive shaft, and a collar turnably mounted on the extension, the pivotal pins on the main housing being turnably mounted in the collar.

4. A tractor including a body, transverse housings at each end of the body, a cylindrical horizontal sleeve on each housing centrally thereof and extending toward the body, both housings having vertical pivotal connection with the body inside the sleeves and one of such housings being also arranged for vertical movement transversely of the body about its sleeve as an axis, collars secured over the sleeves, the latter being turnable therein, and a common means connected to the collars to turn the housings, in a horizontal plane relative to the tractor.

5. A tractor including a body, transverse housings on each end of the body, a cylindrical horizontal sleeve on each housing centrally thereof and extending toward the body, both housings having vertical pivotal connection with the body inside the sleeves and one of such housings being also arranged for vertical movement transversely of the body about its sleeve as an axis, collars secured over the sleeves, the latter being turnable therein, racks attached to the collars and projecting toward each other and being held to the body in a plane parallel thereto, and a common means for actuating the racks.

In testimony whereof I affix my signature in presence of two witnesses.

HORACE HOUSE.

Witnesses:
BERNARD PRIVAT,
FRANK H. CARTER.